UNITED STATES PATENT OFFICE.

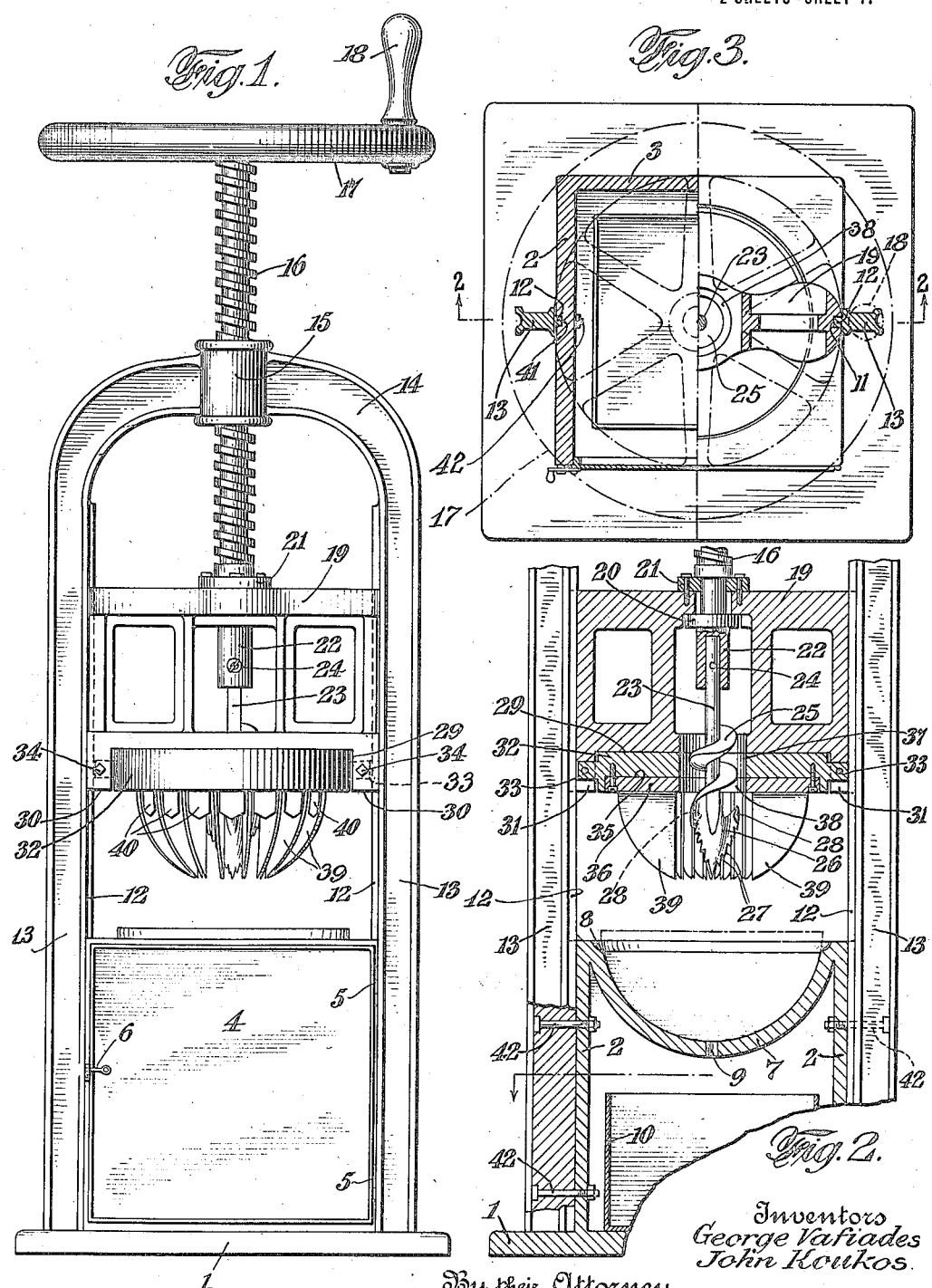

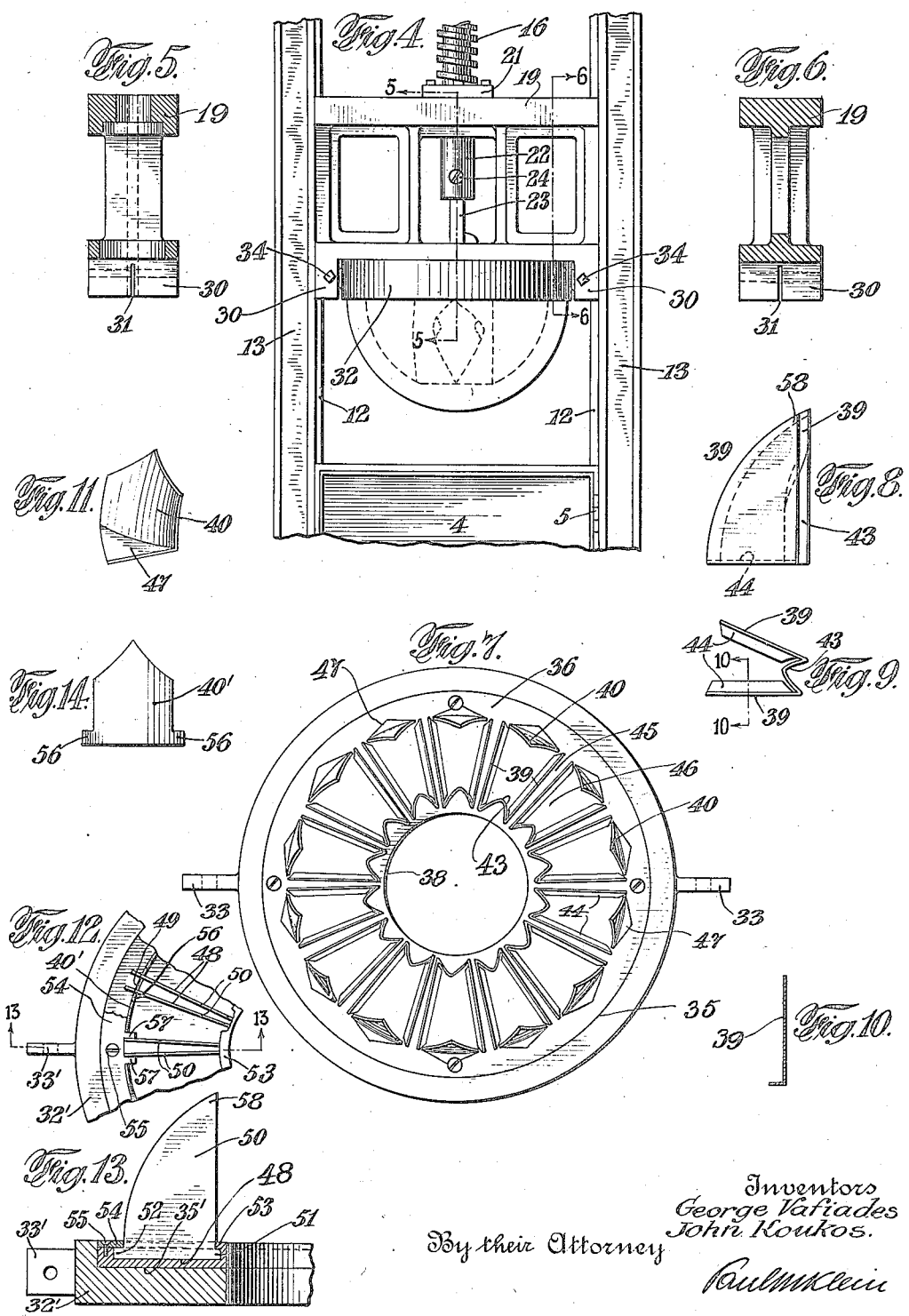

GEORGE VAFIADES AND JOHN KOUKOS, OF NEW YORK, N. Y.

FRUIT SEEDER AND SLICER.

1,423,490. Specification of Letters Patent. Patented July 18, 1922.

Application filed December 16, 1920. Serial No. 431,247.

*To all whom it may concern:*

Be it known that we, GEORGE VAFIADES and JOHN KOUKOS, subjects of Greece, and residents of 302 Eighth Avenue, New York city, in the county of New York and State of New York, have invented certain new and useful Improvements in Fruit Seeders and Slicers, of which the following is a specification.

This invention relates to fruit seeders and slicers and is preferably designed for the cutting or seeding and slicing of grape-fruit or similar fruits.

One of the objects of our invention is to provide a simple, inexpensive, accurately and rapidly working device of this sort which will permit the coring and slicing of any size of grape-fruit which may be desired. Its prime advantage is that it eliminates the tedious cutting of grape-fruit by hand which requires a great amount of labor and time and which is impracticable where large quantities of fruit are to be cut in a limited time.

Another object of our device is to provide means whereby the coring or seeding and the slicing operations are made simultaneously and without interfering with each other.

A further object of our invention is to provide means for moving the cutting or slicing apparatus of our device in downward or upward direction while the coring device is simultaneously rotated within the slicing device.

Another object of our invention is to provide in connection with our apparatus, a fruit receiver adapted to accommodate any size of fruit and provided with means whereby the juice which eventually overflows may be readily saved for future use.

The aforegoing and other objects will be more fully apparent from the following description and the accompanying drawings which form part of this specification and in which Fig. 1 is a front elevation of our device in preferred form.

Fig. 2 is a cross sectional view taken on line 2—2 of Fig. 3.

Fig. 3 is a sectional plan view taken partly through Fig. 2.

Fig. 4 is a front elevation of a portion of our device showing the grape-fruit attached to the cutter after having been sliced.

Fig. 5 is a cross sectional view taken on line 5—5 of Fig. 4.

Fig. 6 is a cross sectional view taken on line 6—6 of Fig. 4.

Fig. 7 is an enlarged top view of the slicer or cutter.

Fig. 8 is a detailed view of a preferred form of radial knives.

Fig. 9 is a top view thereof.

Fig. 10 is a cross sectional view taken on line 10—10 of Fig. 9.

Fig. 11 is a perspective view of a peripheral knife.

Fig. 12 is a top view of a portion of a modified form of the slicer.

Fig. 13 is a cross sectional view taken on line 13—13 of Fig. 12.

Fig. 14 is a plan view of a modified form of a peripheral knife.

Referring to the drawings, 1 represents the base plate of the base member of our device, which base member has a general appearance of a box closed on three sides by walls 2, and 3, and open at the front where a door 4 is hinged at 5 and provided with a bolt 6 by means of which the door may be closed.

The upper portion of the box-like base member is provided at its center with a bowl-like receiver 7, having an annular recess 8 provided at its top and an aperture 9 at its lowest portion.

The recess 8 serves for supporting grape-fruits of sizes larger than the bowl proper would accommodate and the aperture 9 permits the overflowing juice to drip into a removable container 10 disposed within the box-like receiver below the aperture 9. The juice which is usually lost during the cutting of grape-fruit by hand is through our apparatus saved and may be used for culinary purposes.

The side walls 2 of the box-like base member are provided at their center with vertical grooves 11, see Fig. 3, for receiving the guide ribs 12, extending inwardly from the parallel legs 13 of the frame 14.

The upper part of frame 14 is provided at 15 with an enlargement or hub which is internally threaded and adapted to receive an acute threaded spindle 16, which is operable by wheel 17, attached at its upper end, and having a handle 18 secured thereto.

Between the frame legs 13 and guided by the guide ribs 12 is a cutter support 19 to which spindle 16 is rotatably attached by means of collar 20 and split collar 21.

The lower end of the spindle is provided with a spindle head 22 for receiving the corer or seeder 23 which is removable and held firmly in the spindle head by set screw 24.

The seeder is composed of a spindle to which is attached a wide worm 25 terminating in a twisted shovel-like drill 26 provided at its outer edges with cutting teeth 27 and peripherally bent knives 28. (See Fig. 2.)

The cutter support 19 is provided with a recess 29 and lower side extensions 30 provided with slots 31. With recess 29 registers knife support holder 32 from which extend ears 33 adapted to pass into slots 31 of the cutter support 19. The ears are held in place by means of bolts 34 passing through the extensions 30 and ears 33.

In recess 35 of holder 32 is removably attached a knife support 36. Both holder and knife support are provided with apertures 37 and 38 respectively.

Radially disposed and secured to the knife support are blades or knives 39 the purpose and construction of which will be explained later. Near the periphery and the radially disposed knives 39 are peripheral knives 40.

The gliding cutter support 19 is provided with side grooves 41 (see Fig. 3) embracing the guide ribs 12 of the frame 14 whereby the cutter support is guided in a vertical direction when moved up and down through the rotation of spindle 16. The legs 13 of the frame are attached to walls 2 of the base member by means of bolts 42.

The knife support 36 is preferably made in a disk-like form to which various knives are attached. In Figs. 8, 9 and 10 is illustrated a preferred form of knife which comprises blades 39' made of one piece and connected by the cut-out portion 43.

At the lower part of the knives are inwardly bent strips 44, by means of which the knife is soldered or otherwise attached to the knife support.

Knives 39 are radially disposed and so arranged that a small space 45 is formed between a knife set while between the thus formed knife pairs, a larger space 46 is provided. The small spaces 45 allow the fibery portion of the grape fruit to pass through so that its meaty part is readily severed from the fibery portion. Between the narrowly spaced pairs of knives and disposed at the periphery and near the lowest end of the radial knives are peripheral knives 40, which are preferably spherically bent and may possess extensions 47 by means of which they might be soldered to the knife support.

The cutting edges of the peripheral knives are tapered. The function of these knives is to sever the meaty part from the skin of the fruit.

A modified form of knife support and knife is shown in Figs. 12, 13 and 14, where the knife support is provided with radial slots 48 and peripheral slots 49, in the former of which individual knives 50 are placed.

These knives have at their lower portions extensions 51 and 52. To insert the knives, extension 51 is thrust below the annular rim 53 of the knife support while the other extension 52 is covered by an annular ring 54, which is attached to the knife support by means of a screw 55. The knife support itself is again attached within the recess 35' of knife support holder 32' equipped with ears 33'.

The peripheral knives indicated in Fig. 14 by 40' are also equipped with side extensions 56. These peripheral knives are placed the annular slots 49 and held in place by lips 57 extending from ring 54.

While we have shown only two preferred forms of knife construction and arrangement of knife support, it is obvious that both may be designed in many different ways.

In the present or like construction the cutting edges of knives 39 and 40 form portions of a circle and the point of the knife at the junction of the vertical and curved edges thereof, near the periphery of the aperture 39, is highest.

In operation our apparatus is extremely simple. First one half of a grape fruit is placed into receiver 7 of the base member while the gliding cutter support is elevated within the frame 14 by means of spindle 16. Then the cutter support is lowered through turning spindle 16 and while doing so seeder 23 is rotated. In this manner the inner part of the grape fruit is cored out and the cored out portion is forced through the worm 25 to ascend above the grape fruit proper, while the knives are forced down into the grape fruit.

When the flat portion of the knife support reaches the level of the upper grape fruit surface, the spindle is turned in opposite direction and the cutter support is elevated, while the grape fruit remaining attached to the cutter is thus simultaneously lifted with the cutter support.

In this manner the grape fruit ascends from its seat and may be readily removed from our device. It will be found that the seeds and the core of the grape fruit will remain on the surface of the grape fruit and may be easily removed therefrom.

While we have shown specific designs of our invention, be it understood that improvements and changes may be made within the broad scope thereof. We reserve therefore for ourselves the right to make such changes and improvements to meet various conditions arising from the application of our apparatus.

Be it also understood that we shall not be limited to the exclusive use for grape fruit cutting and that other similar fruits may be successfully sliced and cut with an apparatus of our design corresponding to the size of the particular fruit.

We claim:—

1. In a grape fruit seeder and slicer, the combination of a closed frame having internal guides, a box-like base member supporting and disposed between the legs of the frame, a grape fruit receiver provided at the centre of the box-like base member and having a perforation at its bottom, a removable juice receiver disposed within the base member, and below said perforation, a door for closing the base member, an internally threaded hub formed at the top of the frame, a threaded spindle passing through the hub, an operating wheel provided at the upper end of the spindle, a gliding member operable within the frame and guided therein, said spindle rotatably secured to said gliding member, a corer or seeder attached at the other end of and rotating with the said spindle, a slicer attached to said gliding member, said seeder disposed within said slicer, the latter comprising a plurality of pairs of radially disposed knives, and a plurality of peripherally arranged knives disposed between each pair of the radial knives.

2. A grape fruit seeder and slicer, comprising in combination a guide frame having an enlarged upper center portion provided with an internal, acutely inclined thread, an operating spindle passing through said enlarged portion, a hand wheel provided at the upper end of said spindle, a gliding cutter support guided within the frame, said spindle rotatably mounted at and attached to the center portion of the cutter support, a seeder attached at the other end of the spindle and adapted to rotate therewith, a cutter held at the bottom of the cutter support and provided with a central opening for facilitating said seeder to freely rotate therein, said cutter having a plurality of radial double-knives, and a plurality of peripheral knives between each set of the double-knives, a fruit receiver provided with means for seating various sizes of fruit, a perforation at the lowest portion of said receiver, and a juice container disposed below said receiver.

3. In combination with a seeder and slicer, a corer comprising a spindle provided with a wide, helical thread terminating in a pointed, toothed, and twisted cutting member adapted to cut out the seed portion of a fruit and convey it upwards.

4. In combination with a seeder and slicer, a cutter, comprising a knife support having a central aperture, a plurality of radially disposed knives, set in pairs, small spaces provided between the paired knives, larger spaces provided between the knife pairs, peripheral knives disposed at the widest spaces, between the knife pairs, said radial knives being highest at the point nearest to the aperture and lowest near the periphery of said support, said peripheral knives, being spherically bent and having their cutting edges tapered, a knife support holder provided with a recess for receiving said knife support, means for attaching the latter in the recess of the former, and means for suspending said holder.

5. A grape fruit corer and slicer, comprising in combination, a base member provided with means for receiving various sizes of fruit, a guide frame, a cutter support adapted to slide within the latter, a detachable cutter associated with said cutter support, a seeder centrally disposed within the cutter, and operating means for moving said cutter support either upwards or downwards and for simultaneously operating said seeder.

6. In a fruit cutting device, a cutter having a plurality of radially disposed blades and a plurality of peripheral blades the former adapted to slice the meat of a fruit, the latter adapted to simultaneously separate the fruit meat from the skin.

7. In a fruit cutting device a cutter having a plurality of radially disposed double blades and peripheral blades arranged between each pair of blades.

8. In a fruit cutting device a relatively stationary fruit cutter adapted to move toward or from a fruit, and a seeder adapted to revolve within the cutter and to remove the seeds of a fruit, while said cutter is operated.

9. In a fruit cutting device, a seeder comprising a spindle, a toothed cutting element, and twisted means for separating the portion of a fruit, cut by said cutting element, and the seeds of the fruit from the fruit proper.

10. A fruit cutting and coring device comprising a plurality of means for simultaneously separating the meat of a fruit from its skin, cutting the meat into sections and coring the seed portion of the fruit, said means consisting of a cutting element, a coring element, means for simultaneously operating and means for guiding said elements.

11. A fruit cutting and coring device for simultaneously and at one operation slicing the meat of a fruit, separating it from the fruit skin, and coring the seed portion of the fruit, which comprises a cutting element adapted to cut the fruit meat into sections and separate it from the skin, a coring element adapted to function independently of said cutting element, means for simultaneously operating and means for guiding said elements.

12. In a fruit cutting and coring device, a relatively stationary cutting element, and a revoluble coring element operating independently from, but adapted to engage simultaneously with said cutting element a fruit to be sliced and seeded, means for operating and means for guiding said elements.

13. In a fruit cutting and coring device, a cutting member having a plurality of relatively stationary cutting elements disposed radially and peripherally and adapted to be thrust into a fruit, a coring member adapted to revolve within and operating independently of said cutting member, both said members adapted to simultaneously engage a fruit while said coring member revolves, and means for operating and means for guiding said cutting element and said coring member.

14. A fruit cutting and coring device for simultaneously and at one operation slicing the meat of a fruit, separating it from its skin and coring the seed portion of the fruit, which comprises, a relatively stationary cutting element, a revoluble coring element, means for simultaneously operating and means for guiding said elements.

Signed at New York in the county of New York and State of New York this 11 day of December A. D. 1920.

GEORGE VAFIADES.
JOHN KOUKOS.